(12) United States Patent
Mizushima et al.

(10) Patent No.: US 8,304,084 B2
(45) Date of Patent: *Nov. 6, 2012

(54) LIQUID SILICONE RUBBER COATING COMPOSITION AND AIR BAG

(75) Inventors: Hidenori Mizushima, Annaka (JP); Masayuki Ikeno, Maebashi (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 612 days.

This patent is subject to a terminal disclaimer.

(21) Appl. No.: 11/135,293

(22) Filed: May 24, 2005

(65) Prior Publication Data

US 2005/0267257 A1   Dec. 1, 2005

(30) Foreign Application Priority Data

May 25, 2004  (JP) ................................. 2004-155212

(51) Int. Cl.
    *B32B 9/04*  (2006.01)
    *C08L 83/04* (2006.01)

(52) U.S. Cl. ........ 428/447; 525/477; 525/478; 525/479; 524/588; 528/15; 528/31; 528/32

(58) Field of Classification Search ........................ None
    See application file for complete search history.

(56) References Cited

U.S. PATENT DOCUMENTS

| | | | |
|---|---|---|---|
| 4,057,596 A * | 11/1977 | Takamizawa et al. | ........ 525/475 |
| 5,208,097 A | 5/1993 | Honma et al. | |
| 5,258,211 A | 11/1993 | Momii et al. | |
| 5,529,837 A | 6/1996 | Fujiki et al. | |
| 5,567,764 A * | 10/1996 | Brasseur et al. | ............ 524/755 |
| 5,595,826 A * | 1/1997 | Gray et al. | ................ 428/450 |
| 5,877,256 A | 3/1999 | Nakamura et al. | |
| 6,268,300 B1 | 7/2001 | Hernandez et al. | |
| 6,369,184 B1 | 4/2002 | Bohin et al. | |
| 6,425,600 B1 * | 7/2002 | Fujiki et al. | ............... 280/728.1 |
| 6,562,469 B2 * | 5/2003 | Koyama et al. | ............. 428/447 |
| 7,059,627 B2 * | 6/2006 | Ikeno et al. | ............... 280/728.1 |
| 7,153,583 B2 * | 12/2006 | Azechi et al. | ................ 428/447 |
| 2002/0129898 A1 * | 9/2002 | Takuman et al. | ............. 156/329 |

FOREIGN PATENT DOCUMENTS

| | | |
|---|---|---|
| EP | 0 663 468 A1 | 7/1995 |
| JP | 50-141591 | 11/1975 |
| JP | 61-197448 | 9/1986 |
| JP | 2-158442 | 6/1990 |
| JP | 5-25435 | 2/1993 |
| JP | 5-214295 | 8/1993 |
| JP | 06-41874 | 2/1994 |
| JP | 7-70923 | 3/1995 |
| JP | 07-070923 | 3/1995 |
| JP | 7-138535 | 5/1995 |
| JP | 7-195990 | 8/1995 |
| JP | 7-300774 | 11/1995 |
| JP | 09-012891 | 1/1997 |
| JP | 2000-191915 | 7/2000 |
| JP | 2000-508369 | 7/2000 |
| JP | 2001-164187 | 6/2001 |
| JP | 2002-138249 | 5/2002 |
| JP | 2003-278083 | 10/2003 |
| JP | 2003-327833 | 11/2003 |
| JP | 2003-327910 | 11/2003 |
| JP | 2003-330296 | 11/2003 |
| JP | 2004-067948 | 3/2004 |

OTHER PUBLICATIONS

U.S. Appl. No. 11/758,436, filed Jun. 5, 2007, Mizushima, et al.

* cited by examiner

*Primary Examiner* — Marc Zimmer

(74) *Attorney, Agent, or Firm* — Oblon, Spivak, McClelland, Maier & Neustadt, L.L.P.

(57) ABSTRACT

Provided is a liquid silicone rubber coating composition with a viscosity at 25° C. of 10,000 to 100,000 mPa·s, comprising:
- (A) (A-1) a substantially straight chain organopolysiloxane containing alkenyl groups only at both molecular chain terminals, and
  - (A-2) a substantially straight chain organopolysiloxane containing an average of at least two alkenyl groups, only at non-terminal molecular chain positions, within each molecule,
- (B) an organohydrogenpolysiloxane containing an average of at least two hydrogen atoms bonded to silicon atoms within each molecule,
- (C) an addition reaction catalyst, and
- (D) an adhesion improver, as well as an air bag with a rubber coating layer comprising a cured product of such a composition. Also provided is an air bag with a rubber coating layer comprising a cured product of such a composition. The liquid silicone rubber coating composition can be used without dissolution in an organic solvent, and displays excellent adhesion to fiber and excellent rubber strength.

17 Claims, No Drawings

LIQUID SILICONE RUBBER COATING COMPOSITION AND AIR BAG

BACKGROUND OF THE INVENTION

1. Field of the Invention

The present invention relates to a liquid silicone rubber coating composition, which is an adhesive coating agent that can be used without dissolution in an organic solvent, and is ideal for air bags in which the bag portion is woven, and also relates to an air bag with a rubber coating layer comprising a cured product of such a composition.

2. Description of the Prior Art

In recent years, a variety of different silicone rubbers have been used as coating agents for fibers, and those coating agents are used on air bags and the like that are fitted to transportation vehicles such as automobiles. Some air bags are fabricated by overlaying two layers of plain weave base fabric, which have been coated on their respective inside surfaces with a rubber coating layer, bonding the peripheral sections of the two layers of base fabric together with an adhesive, and then stitching the adhesive layer (hereafter referred to as plain weave air bags). Furthermore, air bags in which the bag portion is formed by weaving, which do not require adhesive bonding (hereafter referred to as woven air bags), have also been proposed (see patent reference 1).

However, although woven air bags are compact, they have suffered from a number of problems. Because of their construction, woven air bags comprise the rubber coating layer on the outside surface, meaning that on inflation of the air bag, the inflator gas first contacts the base fabric surface, rather than contacting the rubber coating layer as is the case with plain weave air bags. As a result, if the types of coating agents that have been used with conventional plain weave air bags are applied to woven air bags, then the air bag is unable to be maintained in an inflated state for a constant period of time. Accordingly, the development of a coating agent that can be favorably used within woven air bags has been keenly sought.

A variety of silicone rubber coating agents have been proposed as solutions to the above problem (see patent reference 2 through patent reference 7), but all of these coating agents have required dilution of the agent with an organic solvent prior to use. Furthermore, liquid silicone rubber coating agents that do not require organic solvent dilution have also been proposed (see patent reference 8 through patent reference 11), but none of these has been able to satisfy all the requirements of good adhesion to fiber (the base fabric), favorable rubber strength, and good maintenance of the inflated state, which is required when the coating agent is applied to an air bag.

[Patent Reference 1] JP2-158442A
[Patent Reference 2] JP 5-25435A
[Patent Reference 3] U.S. Pat. No. 5,258,211
[Patent Reference 4] U.S. Pat. No. 5,208,097
[Patent Reference 5] JP7-70923A
[Patent Reference 6] EP 0 663 468 A1
[Patent Reference 7] U.S. Pat. No. 5,529,837
[Patent Reference 8] U.S. Pat. No. 5,877,256
[Patent Reference 9] U.S. Pat. No. 6,268,300
[Patent Reference 10] JP 2002-138249A
[Patent Reference 11] U.S. Pat. No. 6,369,184

SUMMARY OF THE INVENTION

The present invention takes the above circumstances into consideration, with an object of providing a liquid silicone rubber coating composition, which can be used favorably without dissolution in an organic solvent, and displays excellent adhesion to fiber and excellent rubber strength, as well as an air bag with a rubber coating layer comprising a cured product of such a composition.

In order to achieve the above object, the present invention provides a liquid silicone rubber coating composition with a viscosity at 25° C. of 10,000 to 100,000 mPa·s, comprising:
(A) 100 parts by mass of a combination of
  (A-1) a substantially straight chain organopolysiloxane containing alkenyl groups only at both molecular chain terminals, and
  (A-2) a substantially straight chain organopolysiloxane containing an average of at least two alkenyl groups, only at non-terminal molecular chain positions, within each molecule,
(B) an organohydrogenpolysiloxane containing an average of at least two hydrogen atoms bonded to silicon atoms within each molecule, in sufficient quantity to provide from 1 to 7 mols of hydrogen atoms bonded to silicon atoms within this component for each 1 mol of alkenyl groups bonded to silicon atoms within the composition,
(C) an effective quantity of an addition reaction catalyst, and
(D) 0.1 to 10 parts by mass of an adhesion improver.

The present invention also provides an air bag with a rubber coating layer comprising a cured product of the above composition.

A composition of the present invention can be used favorably even without dissolution in an organic solvent, displays excellent adhesion to fibers and excellent rubber strength, and yields a cured product that provides superior physical characteristics such as tensile strength, tear strength, and shear elongation. Furthermore, because the composition also displays excellent ease of application, when applied to an air bag, it forms a rubber coating layer which is resistant to peeling, and is consequently resistant to leakage of the inflator gas, and therefore generates an air bag that displays excellent maintenance of the inflated state. As a result of these actions and effects, the composition is particularly applicable to woven air bags.

DETAILED DESCRIPTION OF THE PREFERRED EMBODIMENTS

As follows is a more detailed description of the present invention. A liquid silicone rubber coating composition of the present invention comprises the components (A) through (D) described below. In this description, room temperature means 25° C. Furthermore, viscosity values refer to values measured at 25° C., and specific surface area values refer to measured values obtained using a BET method.

<(A) Organopolysiloxane>

The organopolysiloxane of the component (A) is the base material of a composition of the present invention, and comprises (A-1) a substantially straight chain organopolysiloxane containing alkenyl groups only at both molecular chain terminals, and (A-2) a substantially straight chain organopolysiloxane containing an average of at least two alkenyl groups, only at non-terminal molecular chain positions, within each molecule.

Of such materials, organopolysiloxanes comprising a combination of, as the component (A-1), a diorganopolysiloxane in which each of the molecular chain terminals is blocked, independently, with a group represented by a formula $R^A R^B_2 SiO_{1/2}$ (wherein, $R^A$ represents an alkenyl group, and each $R^B$ represents, independently, an unsubstituted or substituted monovalent hydrocarbon group that contains no aliphatic unsaturated bonds, these definitions also apply below), a group represented by a formula $R^A{}_2R^BSiO_{1/2}$, or a group represented by a formula $R^A{}_3SiO_{1/2}$, and in which the principal chain comprises a diorganosiloxane unit represented by a formula $R^B{}_2SiO_{2/2}$ as the repeating unit, and as the component (A-2), a copolymer of a diorganosiloxane and an alkenylorganosiloxane, in which both molecular chain terminals are blocked with groups represented by a formula $R^B{}_3SiO_{1/2}$, and in which the principal chain comprises repeating diorganosiloxane units represented by formulas $R^B{}_2SiO_{2/2}$ and $R^AR^B\text{-}SiO_{2/2}$ (and in which the arrangement of these $R^B{}_2SiO_{2/2}$ units and $R^AR^BSiO_{2/2}$ units is random).

The alkenyl group represented by $R^A$ typically contains from 2 to 8, and preferably from 2 to 4, carbon atoms. Specific examples of suitable groups include a vinyl group, allyl group, propenyl group, isopropenyl group, isobutenyl group, butenyl group, pentenyl group, hexenyl group, or heptenyl group, although a vinyl group is preferred.

The unsubstituted or substituted monovalent hydrocarbon group represented by $R^B$ typically contains from 1 to 12, and preferably from 1 to 10, carbon atoms. Specific examples of suitable groups include alkyl groups such as a methyl group, ethyl group, propyl group, butyl group, pentyl group, hexyl group, cyclohexyl group, or heptyl group; aryl groups such as a phenyl group, tolyl group, xylyl group, or naphthyl group; aralkyl groups such as a benzyl group or phenethyl group; and groups in which either a portion of, or all of, the hydrogen atoms within these group have been substituted with a halogen atom such as a fluorine, chlorine, or bromine atom, including halogenated alkyl groups such as a chloromethyl group, 3-chloropropyl group, or 3,3,3-trifluoropropyl group. Of these, a methyl group or phenyl group is preferred.

As follows is a more detailed description of the component (A-1) and the component (A-2).

(A-1) Organopolysiloxane with Both Molecular Chain Terminals Blocked with Alkenyl Groups An organopolysiloxane of the component (A-1) contains at least one alkenyl group bonded to the silicon atom at each of the molecular chain terminals, and preferably contains an average of 2 to 6 terminal silicon atom-bonded alkenyl groups within each molecule.

These alkenyl groups typically contain from 2 to 8, and preferably from 2 to 4, carbon atoms. Specific examples include the same groups presented as examples of the alkenyl group represented by $R^A$, and vinyl groups are preferred. The alkenyl group content within this component is preferably within a range from 0.001 to 10 mol %, and even more preferably from 0.01 to 5 mol %, of all the monovalent organic groups bonded to silicon atoms within the component.

In an organopolysiloxane of this component, the organic groups other than the aforementioned alkenyl groups that are bonded to the silicon atoms at both molecular chain terminals are unsubstituted or substituted monovalent hydrocarbon groups containing from 1 to 12, and preferably from 1 to 10, carbon atoms. Specific examples include the same groups presented as examples of the unsubstituted or substituted monovalent hydrocarbon group represented by $R^B$, and of these, methyl groups and phenyl groups are preferred.

There are no particular restrictions on the viscosity of this component, provided the resulting cured product displays favorable physical characteristics such as the aforementioned tensile strength, tear strength, and shear elongation, and provided the composition displays favorable workability. Viscosity values within a range from 100 to 500,000 mPa·s are preferred, and values from 300 to 100,000 mPa·s are even more desirable.

There are no particular restrictions on the molecular structure of the organopolysiloxane of this component, provided it is a substantially straight chain structure. In this description, a molecular structure described as "substantially straight chain" refers to a molecular structure which although being a straight chain, may comprise branched structures within portions of the straight chain. Examples of such structures include organopolysiloxanes in which non-terminal positions within the molecular chain are primarily of the formula —Si(R$^1$)$_2$O— (wherein, each R$^1$ represents, independently, an unsubstituted or substituted monovalent hydrocarbon group that contains no aliphatic unsaturated bonds), and both molecular chain terminals are blocked with structures of the formula —SiR$^2{}_3$ (wherein, each R$^2$ represents, independently, an unsubstituted or substituted monovalent hydrocarbon group, provided at least one R$^2$ represents an alkenyl group). More specific examples include the organopolysiloxanes represented by a general formula (1) shown below:

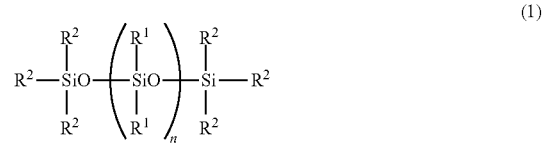

(wherein, each R$^1$ and each R$^2$ is, independently, as defined above, and n represents a number that results in a viscosity at 25° C. of 100 to 500,000 mPa·s).

The unsubstituted or substituted monovalent hydrocarbon groups represented by R$^1$ are groups that satisfy the conditions defined above for the monovalent hydrocarbon groups R$^B$, which differ from the alkenyl groups bonded to the silicon atoms at both molecular chain terminals. The unsubstituted or substituted monovalent hydrocarbon groups represented by R$^2$ are groups that either satisfy the conditions defined for the group R$^B$, or satisfy the conditions defined above for the alkenyl group R$^A$. Specific examples of these groups are the same as those groups presented above.

Specific examples of components (A-1) that satisfy the above requirements include dimethylpolysiloxane with both molecular chain terminals blocked with dimethylvinylsiloxy groups, dimethylpolysiloxane with both molecular chain terminals blocked with divinylmethylsiloxy groups, and dimethylpolysiloxane with both molecular chain terminals blocked with trivinylsiloxy groups.

The organopolysiloxane of the component (A-1) may use either a single material, or a combination of two or more different materials.

(A-2) Organopolysiloxane Containing Non-Terminal Alkenyl Groups

An organopolysiloxane of the component (A-2) contains an average of at least two alkenyl groups within each molecule, only at non-terminal molecular chain positions, and preferably contains an average of 4 to 50, and even more preferably from 8 to 30, of such alkenyl groups within each molecule.

These alkenyl groups typically contain from 2 to 8, and preferably from 2 to 4, carbon atoms. Specific examples include the same groups presented as examples of the alkenyl group represented by $R^A$, and vinyl groups are preferred. The silicon atom-bonded alkenyl group content within this component is preferably within a range from 0.001 to 10 mol %, and even more preferably from 0.01 to 5 mol %, of all the organic groups bonded to silicon atoms within the component.

In an organopolysiloxane of this component, the organic groups other than the aforementioned alkenyl groups that are bonded to silicon atoms at non-terminal molecular chain positions are unsubstituted or substituted monovalent hydrocarbon groups containing from 1 to 12, and preferably from 1 to 10, carbon atoms. Specific examples include the same groups presented as examples of the unsubstituted or substituted monovalent hydrocarbon group represented by $R^B$, and of these, methyl groups and phenyl groups are preferred.

There are no particular restrictions on the viscosity of this component, provided the resulting silicone rubber displays favorable physical characteristics such as tensile strength, tear strength, and shear elongation, and provided the composition displays favorable workability. Viscosity values within a range from 100 to 500,000 mPa·s are preferred, and values from 300 to 100,000 mPa·s are even more desirable.

There are no particular restrictions on the molecular structure of the organopolysiloxane of this component, provided it is a substantially straight chain structure. Examples of suitable structures include organopolysiloxanes in which non-terminal positions within the molecular chain are primarily of the formula —Si($R^3$)$_2$O— (wherein, each $R^3$ represents, independently, an unsubstituted or substituted monovalent hydrocarbon group, provided an average of at least two $R^3$ groups within each molecule are alkenyl groups), and both molecular chain terminals are blocked with structures of the formula —Si$R^4{}_3$ (wherein, each $R^4$ represents, independently, an unsubstituted or substituted monovalent hydrocarbon group that contains no aliphatic unsaturated bonds). More specific examples include the organopolysiloxanes represented by a general formula (2) shown below:

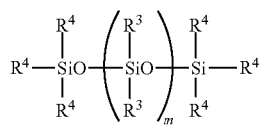

(2)

(wherein, each $R^3$ and each $R^4$ is, independently, as defined above, and m represents a number that results in a viscosity at 25° C. of 100 to 500,000 mPa·s).

The unsubstituted or substituted monovalent hydrocarbon groups represented by $R^4$ are groups that satisfy the conditions defined above for the monovalent hydrocarbon groups $R^B$, which differ from the alkenyl groups bonded to the silicon atoms at both molecular chain terminals. The unsubstituted or substituted monovalent hydrocarbon groups represented by $R^3$ are groups that either satisfy the conditions defined for the group $R^B$, or satisfy the conditions defined above for the alkenyl group $R^A$. Specific examples of these groups are the same as those groups presented above.

Specific examples of components (A-2) that satisfy the above requirements include materials comprising methylvinylsiloxane units, such as copolymers of dimethylsiloxane and methylvinylsiloxane with both molecular chain terminals blocked with trimethylsiloxy groups, methylvinylpolysiloxane with both molecular chain terminals blocked with trimethylsiloxy groups, copolymers of dimethylsiloxane, methylvinylsiloxane, and methylphenylsiloxane with both molecular chain terminals blocked with trimethylsiloxy groups, and copolymers of dimethylsiloxane, methylvinylsiloxane, and diphenylsiloxane with both molecular chain terminals blocked with trimethylsiloxy groups, The organopolysiloxane of the component (A-2) may use either a single material, or a combination of two or more different materials.

There are no particular restrictions on the blend quantity of the component (A-2) within the component (A) [that is, the combination of the component (A-1) and the component (A-2)], although the quantity is typically within a range from 0.1 to 30% by mass, preferably from 1 to 28% by mass, even more preferably from 2 to 25% by mass, and most preferably from 5 to 20% by mass. When this blend quantity falls within the range from 0.1 to 30% by mass, cured products with superior physical characteristics such as tensile strength, tear strength, and shear elongation are obtained.

<(B) Organohydrogenpolysiloxane>

The organohydrogenpolysiloxane of the component (B) reacts with the component (A), and functions as a cross-linking agent, thereby imparting adhesiveness to the cured product. This organohydrogenpolysiloxane contains an average of at least two hydrogen atoms bonded to silicon atoms (namely, hydrosilyl groups, hereafter also referred to as "SiH groups") within each molecule, and preferably contains no alkenyl groups within the molecule. The number of SiH groups within each molecule, on average, is typically within a range from 2 to 500, and preferably from 3 to 200, and most preferably from 3 to 100. The SiH groups may be positioned at the molecular chain terminals, at non-terminal positions within the molecular chain, or at both of these positions.

There are no particular restrictions on the molecular structure of the organohydrogenpolysiloxane of this component, which may be a straight chain, a cyclic structure, a branched structure, or a three dimensional network (resin) type structure, although from the viewpoint of achieving favorable tensile strength, tear strength, and shear elongation for the cured product, a straight chain structure is preferred. From the viewpoints of obtaining a silicone rubber that displays favorable physical characteristics such as tensile strength, tear strength, and shear elongation, and obtaining a composition that displays favorable workability, the number of silicon atoms within each molecule of this component (that is, the polymerization degree) is typically within a range from 2 to 1,000, and preferably from 3 to 300, and most preferably from 4 to 150. Furthermore, the viscosity typically falls within a range from 0.1 to 5,000 mPa·s, and preferably from 0.5 to 1,000 mPa·s, and most preferably from 5 to 500 mPa·s. This component is typically a liquid at room temperature (25° C.).

Examples of this type of organohydrogenpolysiloxane include the polymers represented by the average composition formula (3) shown below.

$$R^5{}_a H_b SiO_{(4-a-b)/2} \quad (3)$$

[wherein, each $R^5$ represents an unsubstituted or substituted monovalent hydrocarbon group that preferably contains no aliphatic unsaturated bonds, a represents a number from 0.7 to 2.1, b represents a number from 0.001 to 1.0, and a+b represents a number within a range from 0.8 to 3.0].

In the above formula, each unsubstituted or substituted monovalent hydrocarbon group represented by $R^5$ preferably contains from 1 to 10, and even more preferably from 1 to 6, carbon atoms. Specific examples of these unsubstituted or substituted monovalent hydrocarbon groups represented by $R^5$ include alkyl groups such as methyl groups, ethyl groups, propyl groups, isopropyl groups, butyl groups, isobutyl groups, tert-butyl groups, pentyl groups, neopentyl groups, hexyl groups, cyclohexyl groups, octyl groups, nonyl groups, and decyl groups; alkenyl groups such as vinyl groups and allyl groups; aryl groups such as phenyl groups, tolyl groups, xylyl groups, and naphthyl groups; aralkyl groups such as benzyl groups, phenylethyl groups, and phenylpropyl groups; and groups in which a portion of, or all of, the hydrogen atoms within these groups have been substituted with a halogen atom such as a fluorine, chlorine, or bromine atom, such as chloromethyl groups, chloropropyl groups, bromoethyl groups, and trifluoropropyl groups. Of these, alkyl groups and aryl groups are preferred, and methyl groups and phenyl groups are particularly desirable.

In the above formula, a is preferably a number from 1.0 to 2.0, b is preferably a number from 0.01 to 1.0, and a+b is preferably a number within a range from 1.5 to 2.5, and components that satisfy all of these requirements are particularly desirable.

Specific examples of this type of organohydrogenpolysiloxane include 1,1,3,3-tetramethyldisiloxane, 1,3,5,7-tetramethylcyclotetrasiloxane, methylhydrogencyclopolysiloxane, cyclic copolymers of dimethylsiloxane and methylhydrogensiloxane, methylhydrogenpolysiloxane with both molecular chain terminals blocked with trimethylsiloxy groups, copolymers of dimethylsiloxane and methylhydrogensiloxane with both molecular chain terminals blocked with trimethylsiloxy groups, copolymers of dimethylsiloxane, methylhydrogensiloxane, and methylphenylsiloxane with both molecular chain terminals blocked with trimethylsiloxy groups, dimethylpolysiloxane with both molecular chain terminals blocked with dimethylhydrogensiloxy groups, copolymers of dimethylsiloxane and methylhydrogensiloxane with both molecular chain terminals blocked with dimethylhydrogensiloxy groups, copolymers of dimethylsiloxane and methylphenylsiloxane with both molecular chain terminals blocked with dimethylhydrogensiloxy groups, methylphenylpolysiloxane with both molecular chain terminals blocked with dimethylhydrogensiloxy groups, copolymers comprising $(H)(CH_3)_2SiO_{1/2}$ units, $(CH_3)_3SiO_{1/2}$ units, and $SiO_{4/2}$ units, and copolymers comprising $(H)(CH_3)_2SiO_{1/2}$ units and $SiO_{4/2}$ units.

Of these, organohydrogenpolysiloxanes comprising a combination of (1) an organohydrogenpolysiloxane, which contains no aliphatic unsaturated bonds, in which both molecular chain terminals are blocked with groups represented by a formula $R^C_3SiO_{1/2}$ (wherein, each $R^C$ represents, independently, an unsubstituted or substituted monovalent hydrocarbon group that contains no aliphatic unsaturated bonds, this definition also applies below), and in which the principal chain comprises a organohydrogensiloxane unit represented by a formula $R^C(H)SiO_{2/2}$ unit as a repeating unit, and (2) a copolymer of a diorganosiloxane and an organohydrogensiloxane, which contains no aliphatic unsaturated bonds, in which each molecular chain terminal is blocked, independently, with a group represented by a formula $R^C_3SiO_{1/2}$, or a group represented by a formula $R^C_2HSiO_{1/2}$, and in which the principal chain comprises a random arrangement of repeating diorganosiloxane units represented by a formula $R^C_2SiO_{2/2}$ units and organohydrogensiloxane units represented by a formula $R^C(H)SiO_{2/2}$ units. Specifically, materials comprising a combination of (1) a methylhydrogenpolysiloxane with both molecular chain terminals blocked with trimethylsiloxy groups, and (2) a copolymer of dimethylsiloxane and methylhydrogensiloxane with both molecular chain terminals blocked with either trimethylsiloxy groups or dimethylhydrogensiloxy groups are preferred.

The unsubstituted or substituted monovalent hydrocarbon group represented by $R^C$ typically contains from 1 to 10, and preferably from 1 to 6, carbon atoms. Specific examples include the same groups presented as examples of the unsubstituted or substituted monovalent hydrocarbon group represented by $R^5$, and methyl groups and phenyl groups are preferred.

The organohydrogenpolysiloxane of the component (B) may use either a single material, or a combination of two or more different materials.

The blend quantity of the component (B) must provide from 1 to 7 mols, and preferably from 2 to 5 mols, of hydrogen atoms bonded to silicon atoms within the component (B) for each 1 mol of alkenyl groups bonded to silicon atoms within the composition of the present invention (and in particular, the component (A)). If this blend quantity provides less than 1 mol of silicon atom-bonded hydrogen atoms, then the strength of the cured product (the rubber coating layer) is inadequate, whereas if the quantity exceeds 7 mols, the heat resistance and strength of the cured product deteriorate markedly.

<(C) Addition Reaction Catalyst>

The addition reaction catalyst of the component (C) is used to accelerate the addition reaction between the silicon atom-bonded alkenyl groups within the component (A) and the SiH groups within the component (B). There are no particular restrictions on this addition reaction catalyst, and suitable examples include platinum-group metals such as platinum, palladium, and rhodium; chloroplatinic acid; alcohol modified chloroplatinic acid; coordination compounds of chloroplatinic acid with olefins, vinylsiloxane, or acetylene compounds; and platinum-group metal compounds such as tetrakis(triphenylphosphine)palladium and chlorotris(triphenylphosphine)rhodium, although of these, platinum compounds are preferred.

The addition reaction catalyst of the component (C) may use either a single material, or a combination of two or more different materials.

The blend quantity of the component (C) need only be an effective catalytic quantity, and a typical quantity, calculated as the mass of the platinum-group metal relative to the combined mass of the component (A) and the component (B), is within a range from 0.1 to 1,000 ppm, with quantities from 1 to 500 ppm being preferred, and quantities from 10 to 100 ppm being particularly desirable. Provided this blend quantity falls within the range from 0.1 to 1,000 ppm, the addition reaction can be accelerated effectively.

<(D) Adhesion Improver>

The adhesion improver of the component (D) has the effect of improving the adhesion of the composition to the synthetic fibers of woven base materials used in air bags, non-woven base materials, and sheets or films of thermoplastic resins. There are no particular restrictions on this adhesion improver, provided it is capable of improving the self-adhesiveness of the composition. Examples of suitable materials include organosilicon compound-based adhesion improvers and non-silicon-containing organic compound-based adhesion improvers. Examples of organosilicon compound-based adhesion improvers include adhesion improvers comprising organosilicon compounds, and examples of non-silicon compound-based adhesion improvers include adhesion improvers comprising allyl esters of organic acids, epoxy ring-opening catalysts, or organotitanium compounds. These improvers can be used either alone, or in combinations of two or more different compounds.

The allyl esters of organic acids must contain no silicon atoms within the molecule, and examples include allyl esters of organic acids that contain one alkenyl group and at least one ester group within each molecule. Suitable organic acids include unsaturated carboxylic acids such as acrylic acid, methacrylic acid, and vinylacetic acid; aromatic carboxylic acids such as benzoic acid, phthalic acid, and pyromellitic acid; and saturated fatty acids such as acetic acid, propionic acid, butyric acid, and lauric acid. Specific examples of allyl esters of these organic acids include the allyl esters of unsaturated carboxylic acids such as acrylic acid, methacrylic acid, and vinylacetic acid; the allyl esters of aromatic carboxylic acids such as allyl benzoate, diallyl phthalate, and tetraallyl pyromellitate; and allyl esters of saturated fatty acids, such as allyl acetate, allyl propionate, allyl butyrate, allyl valerate, and allyl laurate.

The epoxy ring-opening catalysts must also contain no silicon atoms within the molecule, and examples include organometal chelates, as well as amine-based, amide-based, imidazole-based, and anhydride-based epoxy ring-opening catalysts.

Examples of organosilicon compounds include organosilanes, straight chain or cyclic siloxane oligomers comprising from 3 to 100, and preferably from 3 to 50, and most preferably 5 to 20, silicon atoms, (alkoxy)silyl modified products of triallyl isocyanurate, and siloxane derivatives thereof, all of which contain at least one functional group selected from a group consisting of alkenyl groups bonded directly to a silicon atom such as a vinyl group or allyl group; epoxy groups that are bonded to a silicon atom via a carbon atom such as an alkylene group, including a γ-glycidoxypropyl group or β-(3, 4-epoxycyclohexyl)ethyl group; acryloxy and methacryloxy groups that are bonded to a silicon atom via a carbon atom such as an alkylene group, including a γ-acryloxypropyl group or γ-methacryloxypropyl group; alkoxy groups such as a methoxy group, ethoxy group, propoxy group, or butoxy group; alkoxysilyl groups which may contain 1 or 2 ester structures, urethane structures, or ether structures, and which are bonded to a silicon atom via an alkylene group, including a trimethoxysilyl group, triethoxysilyl group, or methyldimethoxysilyl group; isocyanate groups; and SiH groups. The organosilicon compound preferably contains two or more of the above functional groups within each molecule.

If these allyl esters of organic acids, epoxy ring-opening catalysts or organosilicon compounds contain an epoxy group within the molecule, then the viscosity of the composition and the adhesiveness on curing can be maintained at favorable levels. Accordingly, the epoxy equivalence of these compounds is preferably within a range from 100 to 5,000 g/mol, and even more preferably from 150 to 3,000 g/mol.

Specific examples of the above type of organosilicon compound include the compounds shown below.

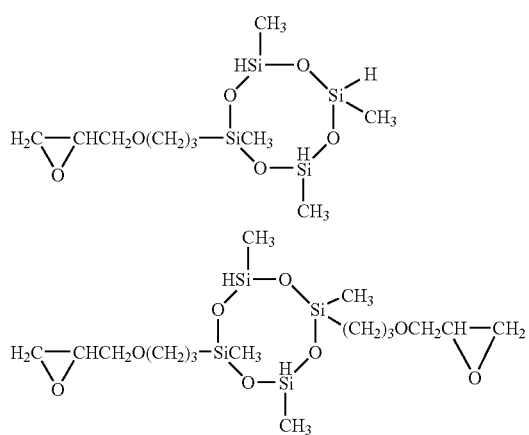

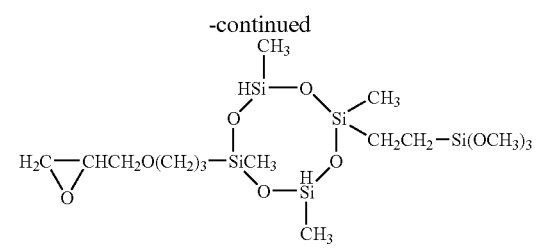

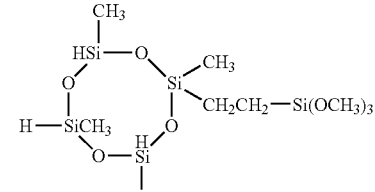

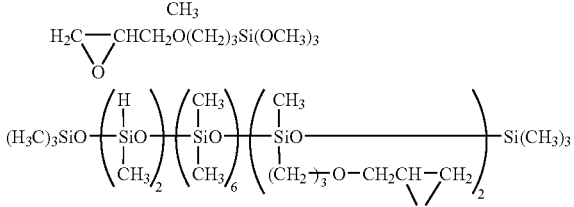

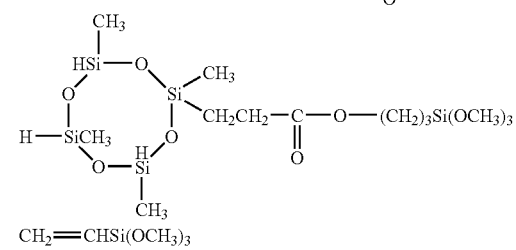

$CH_2=CHSi(OCH_3)_3$

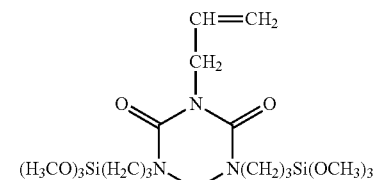

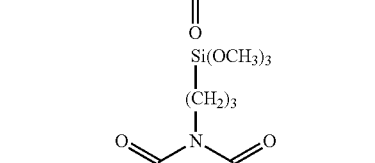

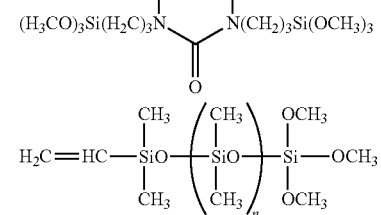

(wherein, n is an integer from 1 to 98)

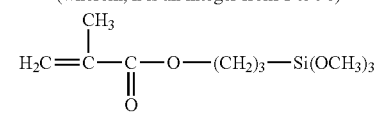

The organotitanium compounds must contain no silicon atoms within the molecule, and specific examples include tetrabutoxytitanium, tetrakis(2-ethylhexyloxy)titanium, tetrastearyloxytitanium, titanium stearate, tetraoctyloxytitanium, titanium isopropoxyoctylene glycol, triethanolamino titanate, titanium acetylacetonate, titanium ethylacetonate, titanium lactonate, and oligomers and polymers generated as condensation reaction products of the above compounds.

As the component (D), at least one compound selected from a group consisting of allyl esters of organic acids with an epoxy equivalence of 100 to 5,000 g/mol, epoxy ring-opening catalysts with an epoxy equivalence of 100 to 5,000 g/mol, organosilicon compounds with an epoxy equivalence of 100 to 5,000 g/mol, organosilicon compounds containing an alkenyl group and/or hydrosilyl group, and an alkoxy group within each molecule, organosilicon compounds containing a nitrogen atom, and organotitanium compounds containing at least 12 carbon atoms is particularly preferred.

The adhesion improver of the component (D) may use either a single material, or a combination of two or more different materials.

There are no particular restrictions on the blend quantity of the component (D), although it must fall within a range from 0.1 to 10 parts by mass per 100 parts by mass of the component (A), and is preferably within a range from 0.5 to 5 parts by mass. If this blend quantity is less than 0.1 parts by mass, then the cured product does not achieve adequate peel adhesive strength, whereas if the quantity exceeds 10 parts by mass, then not only do the rubber strength and peel adhesive strength of the cured product deteriorate, but the increased costs make the composition uneconomic.

<Optional Components>

In addition to the components (A) through (D) described above, other optional components such as those described below can also be added, provided such addition does not impair the effects of the present invention. These optional components can be used either alone, or in combinations of two or more different components.

Finely Powdered Silica

Finely powdered silica acts as a reinforcing agent, imparting a high level of tear strength to a cured product obtained by curing a composition of the present invention. In order to enable the formation of a rubber coating layer with more favorable levels of tear strength, this finely powder silica typically displays a specific surface area, as determined by a BET method, of at least 50 m$^2$/g, and this specific surface area value is preferably within a range from 50 to 400 m$^2$/g, and even more preferably from 100 to 300 m$^2$/g.

There are no particular restrictions on the finely powdered silica of this component, provided it satisfies the above condition, and any silica used conventionally as a reinforcing filler for silicone rubbers may be used. Suitable examples include precipitated silica, fumed silica, and calcined silica. These silica products may be used as is, in an untreated form, although in order to impart more favorable flowability to the composition, the silica is preferably used in the form of a hydrophobic finely powdered silica, produced by subjecting the surface of the silica to hydrophobic treatment with a silazane such as hexamethyldisilazane; a silane coupling agent such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, dimethyldichlorosilane, divinyldimethoxysilane, and chloropropyltrimethoxysilane; or an organosilicon compound such as a polymethylsiloxane or an organohydrogenpolysiloxane.

The finely powdered silica of this component may use either a single material, or a combination of two or more different materials.

There are no particular restrictions on the blend quantity of the finely powdered silica of this component, although the quantity is typically within a range from 0 to 50 parts by mass, and preferably from 1 to 50 parts by mass, and even more preferably from 1 to 30 parts by mass, per 100 parts by mass of the component (A). If this blend quantity is too large, then the flowability of the composition may deteriorate, leading to a worsening of composition workability.

Reaction Control Agents

A reaction control agent may be any compound with an inhibiting effect on the curing reaction promoted by the addition reaction catalyst of the aforementioned component (C), and conventional reaction control agents can be used. Specific examples of suitable reaction control agents include phosphorus-containing compounds such as triphenylphosphine; nitrogen-containing compounds such as tributylamine, tetramethylethylenediamine, and benzotriazole; sulfur-containing compounds; acetylene-based compounds such as acetylene alcohols; compounds containing at least 2 alkenyl groups such as cyclic methylvinylsiloxanes; hydroperoxy compounds; and maleic acid derivatives.

The effect of the reaction control agent in inhibiting the curing reaction varies depending on the chemical structure, and consequently the blend quantity of the reaction control agent is preferably adjusted to the most appropriate quantity for the particular reaction control agent being used. By using the most appropriate quantity of the reaction control agent, a composition with a superior level of long term storage stability at room temperature (25° C.), and superior curability can be obtained.

Inorganic Fillers

Examples of suitable inorganic fillers include fillers such as crystalline silica, hollow fillers, silsesquioxanes, fumed titanium dioxide, magnesium oxide, zinc oxide, iron oxide, aluminum hydroxide, magnesium carbonate, calcium carbonate, zinc carbonate, layered mica, carbon black, diatomaceous earth, and glass fiber; the above types of inorganic fillers that have undergone hydrophobic surface treatment with an organosilicon compound such as an organoalkoxysilane compound, organochlorosilane compound, organosilazane compound, or low molecular weight siloxane compound; as well as silicone rubber powders and silicone resin powders.

Other Components

Examples of other optional components include organopolysiloxanes containing one SiH group or one alkenyl group within each molecule, but containing no other functional groups, such as straight chain diorganopolysiloxanes containing an alkenyl group or a hydrosilyl group at one terminal of the molecular chain, and with the other terminal blocked with a trialkylsiloxy group, and straight chain diorganopolysiloxanes in which both molecular chain terminals are blocked with trialkylsiloxy groups; unreactive organopolysiloxanes containing no SiH groups or alkenyl groups; as well as creep hardening prevention agents, plasticizers, thixotropic imparting agents, pigments, dyes, moldproofing agents, and organopolysiloxane resins with three dimensional network structures that are used for improving the rubber strength of the cured product, which comprise, for example, $R_3SiO_{1/2}$ units (wherein, R is the same as the groups $R^1$ and $R^2$ defined above) and $SiO_{4/2}$ units, and which may, or may not, contain alkenyl groups.

In addition, although a composition of the present invention can be favorably employed without adding an organic solvent, the composition may also be diluted to a desired concentration with an organic solvent such as toluene or xylene prior to coating of the substrate, depending on the type of apparatus being used and other coating conditions.

<Coating Agents>

A composition of the present invention can be prepared by mixing together the aforementioned components (A) through (D), together with any optional components that may be required. A composition prepared in this manner is useful as a coating agent for fibers, and as a coating agent for air bags, and is particularly useful as a coating agent for woven air bags.

In those cases where a composition is used as a coating agent for an air bag, the composition is preferably a low viscosity liquid at room temperature (25° C.). The viscosity of the composition is preferably within a range from 10,000 to 100,000 mPa·s, and even more preferably from 20,000 to 90,000 mPa·s, and most preferably from 30,000 to 80,000 mPa·s. If this viscosity is less than 10,000 mPa·s, then the coating agent tends to impregnate into the fabric of the air bag, meaning the inflated state of the air bag cannot be maintained for a satisfactory time period, whereas if the viscosity exceeds 100,000 mPa·s, then it becomes difficult to achieve a favorable coating layer surface following completion of the coating process.

Furthermore, curing of the above composition can be conducted using conventional curing methods and conditions, and is typically conducted at 120 to 180° C. for a period of 0.1 to 10 minutes.

A cured product produced by curing a composition of the present invention in this manner typically displays a tear strength of at least 15 kN/m, and preferably from 15 to 30 kN/m, and a peel adhesive strength of at least 30 N/cm, and preferably from 30 to 60 N/cm. If the tear strength is at least 15 kN/m, then the mechanical strength of the rubber coating layer at the fabric joins is superior, enabling the inflated state of the air bag to be maintained for a longer time. Furthermore, if the peel adhesive strength is at least 30 N/cm, then the rubber coating layer at the fabric joins is able to favorably bond with the fabric, enabling the inflated state of the air bag to be maintained for a longer time.

<Air Bags>

There are no particular restrictions on the air bags, and preferably woven air bags, containing a rubber coating layer comprising a cured product of a composition of the present invention, and conventional air bags can be used. Specific examples of suitable air bags include those formed from synthetic fibers such as Nylon 66, Nylon 6, polyester fiber, aramid fiber, and polyaramid fiber; those formed from non-woven base fabrics; and those formed using a woven substrate of a sheet or film of a thermoplastic resin as the base fabric.

There are no particular restrictions on the method used for coating a composition of the present invention onto these air bags, and conventional methods can be adopted. The quantity of the composition applied to the surface of an air bag (base fabric) in order to form the rubber coating layer is typically within a range from 15 to 150 g/m², and preferably from 15 to 80 g/m², and most preferably from 20 to 60 g/m².

EXAMPLES

As follows is a more detailed description of the present invention using a series of examples, although the present invention is in no way restricted to the examples presented below. The units "parts" refer to "parts by mass", and viscosity values represent values measured at 25° C. Furthermore, the adhesive improvers (i) to (iii) used in the examples refer to compounds with the structures represented by the following chemical formulas.

Adhesion Improver (i) [Epoxy Equivalence: 238 g/mol]

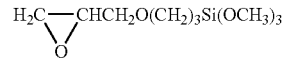

Adhesion Improver (ii)

Adhesion Improver (iii)

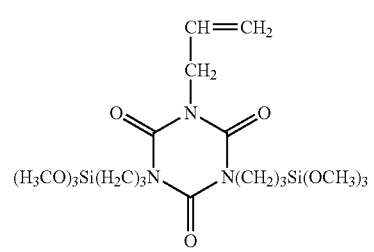

Example 1

A composition A was prepared by mixing together 40 parts of a dimethylpolysiloxane with a viscosity of 1,000 mPa·s and with both molecular chain terminals blocked with dimethylvinylsiloxy groups, 40 parts of a dimethylpolysiloxane with a viscosity of 5,000 mPa·s and with both molecular chain terminals blocked with dimethylvinylsiloxy groups, 20 parts of a copolymer of dimethylsiloxane and methylvinylsiloxane, in which the non-terminal (principal chain) diorganosiloxane units comprise 5 mol % of methylvinylsiloxane units and 95 mol % of dimethylsiloxane units, with a viscosity of 700 mPa·s and with both molecular chain terminals blocked with trimethylsiloxy groups, 17 parts of a hydrophobic finely powdered silica that had undergone hydrophobic surface treatment with trimethylsilyl groups, with a BET specific surface area of 120 m²/g, 5.0 parts of a methylhydrogenpolysiloxane with a viscosity of 50 mPa·s and with both molecular chain terminals blocked with trimethylsiloxy groups (silicon atom-bonded hydrogen atoms: 1.14% by mass), 2.2 parts of a copolymer of dimethylsiloxane and methylhydrogensiloxane, with a viscosity of 25 mPa·s and with SiH groups at both molecular chain terminals and at non-terminal positions within the molecular chain (silicon atom-bonded hydrogen atoms: 0.54% by mass) [here, the number of mols of hydrogen atoms bonded to silicon atoms within the component (B) for each 1 mol of alkenyl groups bonded to silicon atoms within the composition (hereafter referred to as the "SiH/alkenyl" ratio)=3.9 mols/mol], 0.05 parts of 1-ethynylcyclohexanol, a complex of chloroplatinic acid and divinyltetramethyldisiloxane, in sufficient quantity to provide a mass of platinum metal, relative to the combined mass of the component (A) and the component (B), of 30 ppm, 1.5 parts of the above adhesion improver (i), 0.5 parts of the adhesion improver (ii), and 0.5 parts of octyl titanate.

This composition A was cured by heating at 150° C. for 5 minutes, and the thus obtained cured product was used to prepare test sheets in accordance with JIS K6249. Using these test sheets, the typical physical properties (hardness, tensile strength, shear elongation, and tear strength) were measured using conventional methods. Furthermore, using test sheets, the ease of application was evaluated, and a peel adhesive strength test and inflation test were also conducted using the measurement and evaluation methods described below (hereafter, the measurement and evaluation of the typical physical properties and the ease of application, and the conducting of the peel adhesive strength test and the inflation test are referred to simply as an "evaluation of the characteristics"). The results obtained are shown in Table 1.

Example 2

A composition B was prepared by mixing together 40 parts of a dimethylpolysiloxane with a viscosity of 1,000 mPa·s and with both molecular chain terminals blocked with dimethylvinylsiloxy groups, 45 parts of a dimethylpolysiloxane with a viscosity of 5,000 mPa·s and with both molecular chain terminals blocked with dimethylvinylsiloxy groups, 15 parts of a copolymer of dimethylsiloxane and methylvinylsiloxane, in which the non-terminal (principal chain) diorganosiloxane units comprise 10 mol % of methylvinylsiloxane units and 90 mol % of dimethylsiloxane units, with a viscosity of 500 mPa·s and with both molecular chain terminals blocked with trimethylsiloxy groups, 5 parts of an organopolysiloxane comprising 39.5 mol % of $(CH_3)_3SiO_{1/2}$ units, 6.5 mol % of $(CH_3)_2(CH_2=CH)SiO_{1/2}$ units, and 54 mol % of $SiO_2$ units, 22 parts of a hydrophobic finely powdered silica that had undergone hydrophobic surface treatment with trimethylsilyl groups, with a BET specific surface area of 170 m$^2$/g, 5.8 parts of a methylhydrogenpolysiloxane with a viscosity of 45 mPa·s and with both molecular chain terminals blocked with trimethylsiloxy groups (silicon atom-bonded hydrogen atoms: 1.14% by mass), 5.3 parts of a copolymer of dimethylsiloxane and methylhydrogensiloxane, with a viscosity of 12 mPa·s and with SiH groups at both molecular chain terminals and at non-terminal positions within the molecular chain (silicon atom-bonded hydrogen atoms: 0.54% by mass) [SiH/alkenyl ratio=3.4 mols/mol], 0.03 parts of 1-ethynylcyclohexanol, a complex of chloroplatinic acid and divinyltetramethyldisiloxane, in sufficient quantity to provide a mass of platinum metal, relative to the combined mass of the component (A) and the component (B), of 15 ppm, 1 part of the above adhesion improver (i), 0.5 parts of the adhesion improver (iii), and 0.5 parts of octyl titanate.

Using the same method as the example 1, test sheets were prepared from the composition B, and these test sheets were used to evaluate the characteristics. The results obtained are shown in Table 1.

Comparative Example 1

A composition C was prepared by mixing together 50 parts of a dimethylpolysiloxane with a viscosity of 5,000 mPa·s and with both molecular chain terminals blocked with dimethylvinylsiloxy groups, 50 parts of a dimethylpolysiloxane with a viscosity of 30,000 mPa·s and with both molecular chain terminals blocked with dimethylvinylsiloxy groups, 22 parts of a hydrophobic finely powdered silica that had undergone hydrophobic surface treatment with trimethylsilyl groups, with a BET specific surface area of 170 m$^2$/g, 1 part of a methylhydrogenpolysiloxane with a viscosity of 45 mPa·s and with both molecular chain terminals blocked with trimethylsiloxy groups (silicon atom-bonded hydrogen atoms: 1.14% by mass), 2 parts of a copolymer of dimethylsiloxane and methylhydrogensiloxane, with a viscosity of 25 mPa·s and with SiH groups at both molecular chain terminals and at non-terminal positions within the molecular chain (silicon atom-bonded hydrogen atoms: 0.54% by mass) [SiH/alkenyl ratio=4.1 mols/mol], 0.06 parts of 1-ethynylcyclohexanol, a complex of chloroplatinic acid and divinyltetramethyldisiloxane, in sufficient quantity to provide a mass of platinum metal, relative to the combined mass of the component (A) and the component (B), of 15 ppm, 1.5 parts of the above adhesion improver (i), 0.5 parts of the adhesion improver (iii), and 0.5 parts of octyl titanate.

Using the same method as the example 1, test sheets were prepared from the composition C, and these test sheets were used to evaluate the characteristics. The results obtained are shown in Table 1.

Comparative Example 2

A composition D was prepared by mixing together 100 parts of a dimethylpolysiloxane with a viscosity of 600 mPa·s and with both molecular chain terminals blocked with dimethylvinylsiloxy groups, 33 parts of a hydrophobic finely powdered silica that had undergone hydrophobic surface treatment with trimethylsilyl groups, with a BET specific surface area of 170 m$^2$/g, 2.7 parts of a methylhydrogenpolysiloxane with a viscosity of 45 mPa·s and with both molecular chain terminals blocked with trimethylsiloxy groups (silicon atom-bonded hydrogen atoms: 1.14% by mass), 3.3 parts of a copolymer of dimethylsiloxane and methylhydrogensiloxane, with a viscosity of 12 mPa·s and with SiH groups at both molecular chain terminals and at non-terminal positions within the molecular chain (silicon atom-bonded hydrogen atoms: 0.54% by mass) [SiH/alkenyl ratio=3.3 mols/mol], 0.06 parts of 1-ethynylcyclohexanol, a complex of chloroplatinic acid and divinyltetramethyldisiloxane, in sufficient quantity to provide a mass of platinum metal, relative to the combined mass of the component (A) and the component (B), of 15 ppm, 1.5 parts of the above adhesion improver (i), 0.5 parts of the adhesion improver (ii), and 0.5 parts of octyl titanate.

Using the same method as the example 1, test sheets were prepared from the composition D, and these test sheets were used to evaluate the characteristics. The results obtained are shown in Table 1.

<Measurement and Evaluation Methods>

1. Ease of Application

Woven air bags were coated with the prepared compositions using a coater, in a manner that enabled formation of a uniform coating with no unevenness, and with the quantity used of each composition kept to a minimum. The ease of application during this coating process was evaluated by inspecting the thickness of the coating, and assigning an evaluation of "good", represented by the symbol "O", if the composition was able to be applied uniformly with no unevenness, or an evaluation of "poor", represented by the symbol "x", if the composition was unable to be applied uniformly, and unevenness occurred. Subsequently, each air bag that had been coated with one of the compositions was placed in an oven and heated at 170° C. for 1 minute, thereby curing the coating and completing the preparation of a woven air bag.

2. Peel Adhesive Strength Test

Each of the prepared compositions was sandwiched between 2 sheets of woven Nylon 66 (420 denier) used in air bag production, in sufficient quantity to form a layer of thickness 0.5 mm, and the composition was subsequently cured by applying a pressure of 490 kN/m$^2$ at 170° C. for a period of 1 minute. The resulting cured product was cut into strips of width 2.5 cm×length 20 cm. A peel adhesive strength test was then conducted by pulling the two sheets of Nylon 66 at an angle of 180 degrees and at a speed of 50 mm/minute.

3. Inflation Test

Each of the woven air bags prepared for the above section "1. Ease of application" was inflated instantaneously by blowing in air at a pressure of 690 kN/m² for 3 seconds, and the air tightness through the wall thickness of the bag was observed. The inflation was evaluated as "good", represented by the symbol "O", if no separation of the rubber coating layer was observed, or evaluated as "poor", represented by the symbol "x", if separation of the rubber coating layer was detected.

<Test Results>

TABLE 1

|  | Example 1 | Example 2 | Comparative example 1 | Comparative example 2 |
|---|---|---|---|---|
| Viscosity (mPa·s) | 50,000 | 80,000 | 120,000 | 5,000 |
| Hardness (durometer A) | 35 | 45 | 34 | 44 |
| Tensile strength (MPa) | 7.0 | 6.5 | 5.0 | 4.5 |
| Shear elongation (%) | 400 | 400 | 250 | 250 |
| Tear strength (kN/m) | 20 | 20 | 10 | 10 |
| Ease of application | O | O | x | x |
| Peel adhesive strength (N/cm) | 40 | 40 | 20 | 20 |
| Inflation test | O | O | x | x |

What is claimed is:

1. An air bag having a rubber coating layer comprising a cured product of a liquid silicone rubber coating composition with a viscosity at 25° C. of 10,000 to 100,000 mPa·s, consisting of:

(A) 100 parts by mass of a combination of substantially straight chain alkenyl group-containing organopolysiloxanes consisting of (A-1) a substantially straight chain diorganopolysiloxane containing alkenyl groups only at both molecular chain terminals, in which each of said molecular chain terminals is blocked, independently, with a group represented by a formula $R^A R^B{}_2 SiO_{1/2}$ (wherein, $R^A$ represents an alkenyl group, and each $R^B$ represents, independently, an unsubstituted or substituted monovalent hydrocarbon group that contains no aliphatic unsaturated bonds, and these definitions also apply below), a group represented by a formula $R^A{}_2 R^B SiO_{1/2}$, or a group represented by a formula $R^A{}_3 SiO_{1/2}$, and in which a principal chain comprises a $R^B{}_2 SiO_{2/2}$ unit as a repeating unit, said diorganopolysiloxane having a viscosity at 25° C. of 100 to 5,000 mPa·s, and (A-2) a substantially straight chain copolymer of a diorganosiloxane and an alkenylorganosiloxane containing an average of at least two alkenyl groups, only at non-terminal molecular chain positions, within each molecule, in which both molecular chain terminals are blocked with groups represented by a formula $R^B{}_3 SiO_{1/2}$, and in which a principal chain comprises a random arrangement of repeating $R^B{}_2 SiO_{2/2}$ units and $R^A R^B SiO_{2/2}$ units, (B) an organohydrogenpolysiloxane containing an average of at least two hydrogen atoms bonded to silicon atoms within each molecule, in sufficient quantity to provide from 1 to 7 mols of hydrogen atoms bonded to silicon atoms for each 1 mol of alkenyl groups bonded to silicon atoms within said composition, said organohydrogenpolysiloxane comprising:

(B-1) an organohydrogenpolysiloxane in which both molecular chain terminals are blocked with groups represented by a formula $R^C{}_3 SiO_{1/2}$ (wherein, each $R^C$ represents, independently, an unsubstituted or substituted monovalent hydrocarbon group that contains no aliphatic unsaturated bonds, and this definition also applies below), and in which a principal chain consists of an organopolysiloxane unit represented by a formula $R^C H SiO_{2/2}$ as a repeating unit, and (B-2) a copolymer of a diorganosiloxane and an organohydrogensiloxane, in which each molecular chain terminal is blocked, independently, with a group represented by a formula $R^C{}_3 SiO_{1/2}$, or a group represented by a formula $R^C{}_2 H SiO_{1/2}$, (C) an effective quantity of an addition reaction catalyst, and (D) 0.1 to 10 parts by mass of an adhesion improver.

2. The air bag stated in claim 1, wherein said component (A-2) is an organopolysiloxane containing a methylvinylsiloxane unit.

3. The air bag stated in claim 1, wherein a quantity of said component (A-2) is within a range from 0.1 to 30% by mass relative to a combined mass of said component (A-1) and said component (A-2).

4. The air bag stated in claim 1, wherein said component (D) is at least one compound selected from a group consisting of allyl esters of organic acids with an epoxy equivalence of 100 to 5,000 g/mol, epoxy ring-opening catalysts with an epoxy equivalence of 100 to 5,000 g/mol, organosilicon compounds with an epoxy equivalence of 100 to 5,000 g/mol, organosilicon compounds containing at least one alkenyl group and/or hydrosilyl group, and at least one alkoxy group within each molecule, organosilicon compounds containing a nitrogen atom, and organotitanium compounds containing at least 12 carbon atoms.

5. The air bag stated in claim 1, wherein a bag portion is woven.

6. The air bag of claim 1, wherein the viscosity of the liquid silicone coating composition is from 50,000 to 80,000 mPa·s.

7. The air bag of claim 1, wherein the cured product has a shear elongation of 400%.

8. The air bag stated in claim 1, wherein the viscosity of the diorganopolysiloxane at 25° C. is from 300 to 5,000 mPa·s.

9. An air bag having a rubber coating layer comprising a cured product of a liquid silicone rubber coating composition with a viscosity at 25° C. of 10,000 to 100,000 mPa·s, consisting of:

(A) 100 parts by mass of a combination of substantially straight chain alkenyl group-containing organopolysiloxanes consisting of (A-1) a substantially straight chain diorganopolysiloxane containing alkenyl groups only at both molecular chain terminals, in which each of said molecular chain terminals is blocked, independently, with a group represented by a formula $R^A R^B{}_2 SiO_{1/2}$ (wherein, $R^A$ represents an alkenyl group, and each $R^B$ represents, independently, an unsubstituted or substituted monovalent hydrocarbon group that contains no aliphatic unsaturated bonds, and these definitions also apply below), a group represented by a formula $R^A{}_2 R^B SiO_{1/2}$, or a group represented by a formula $R^A{}_3 SiO_{1/2}$, and in which a principal chain comprises a $R^B{}_2 SiO_{2/2}$ unit as a repeating unit, said diorganopolysiloxane having a viscosity at 25° C. of 100 to 5,000 mPa·s, and (A-2) a substantially straight chain copolymer of a diorganosiloxane and an alkenylorganosiloxane containing an average of at least two alkenyl groups, only at non-terminal molecular chain positions, within each molecule, in which both molecular chain terminals are blocked with groups represented by a formula $R^B{}_3SiO_{1/2}$, and in which a principal chain comprises a random arrangement of repeating $R^B{}_2SiO_{2/2}$ units and $R^A R^B SiO_{2/2}$ units, (B) an organohydrogenpolysiloxane containing an average of at least two hydrogen atoms bonded to silicon atoms within each molecule, in sufficient quantity to provide from 1 to 7 mols of hydrogen atoms bonded to silicon atoms for each 1 mol of alkenyl groups bonded to silicon atoms within said composition, said organohydrogenpolysiloxane comprising:

(B-1) an organohydrogenpolysiloxane in which both molecular chain terminals are blocked with groups represented by a formula $R^C{}_3SiO_{1/2}$ (wherein, each $R^C$ represents, independently, an unsubstituted or substituted monovalent hydrocarbon group that contains no aliphatic unsaturated bonds, and this definition also applies below), and in which a principal chain consists of an organopolysiloxane unit represented by a formula $R^C HSiO_{2/2}$ as a repeating unit, and (B-2) a copolymer of a diorganosiloxane and an organohydrogensiloxane, in which each molecular chain terminal is blocked, independently, with a group represented by a formula $R^C{}_3SiO_{1/2}$, or a group represented by a formula $R^C{}_2HSiO_{1/2}$, (C) an effective quantity of an addition reaction catalyst, (D) 0.1 to 10 parts by mass of an adhesion improver, and (E) one or more components selected from the group consisting of finely powdered silica; reaction control agents; inorganic fillers other than the finely powdered silica; organopolysiloxanes containing one SiH group or one alkenyl group within each molecule, but containing no other function groups; unreactive organopolysiloxanes containing no SiH groups or alkenyl groups, as creep hardening prevention agents; plasticizers; thixotropic imparting agents; pigments; dyes; moldproofing agents; organopolysiloxane resins with three dimensional network structures which may, or may not, contain alkenyl groups; and organic solvents.

10. The air bag stated in claim 9, wherein said component (A-2) is an organopolysiloxane containing a methylvinylsiloxane unit.

11. The air bag stated in claim 9, wherein a quantity of said component (A-2) is within a range from 0.1 to 30% by mass relative to a combined mass of said component (A-1) and said component (A-2).

12. The air bag stated in claim 9, wherein said component (D) is at least one compound selected from a group consisting of allyl esters of organic acids with an epoxy equivalence of 100 to 5,000 g/mol, epoxy ring-opening catalysts with an epoxy equivalence of 100 to 5,000 g/mol, organosilicon compounds with an epoxy equivalence of 100 to 5,000 g/mol, organosilicon compounds containing at least one alkenyl group and/or hydrosilyl group, and at least one alkoxy group within each molecule, organosilicon compounds containing a nitrogen atom, and organotitanium compounds containing at least 12 carbon atoms.

13. The air bag stated in claim 9, which contains no organic solvent.

14. The air bag stated in claim 9, wherein a bag portion is woven.

15. The air bag of claim 9, wherein the viscosity of the liquid silicone coating composition is from 50,000 to 80,000 mPa·s.

16. The air bag of claim 9, wherein the cured product has a shear elongation of 400%.

17. The air bag stated in claim 9, wherein the viscosity of the diorganopolysiloxane at 25° C. is from 300 to 5,000 mPa·s.

* * * * *